United States Patent
Seaton

(10) Patent No.: US 9,731,690 B2
(45) Date of Patent: Aug. 15, 2017

(54) AUTOMATIC BRAKING SYSTEM

(71) Applicant: Electro-Motive Diesel, Inc., LaGrange, IL (US)

(72) Inventor: James David Seaton, Westmont, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 127 days.

(21) Appl. No.: 14/700,476

(22) Filed: Apr. 30, 2015

(65) Prior Publication Data

US 2016/0318491 A1  Nov. 3, 2016

(51) Int. Cl.
| | |
|---|---|
| *B60T 17/22* | (2006.01) |
| *B60T 7/12* | (2006.01) |
| *B61H 13/00* | (2006.01) |
| *B60T 13/66* | (2006.01) |
| *B60T 8/17* | (2006.01) |
| *B60T 15/02* | (2006.01) |
| *B60T 13/36* | (2006.01) |
| *B60W 10/18* | (2012.01) |

(52) U.S. Cl.
CPC ............ *B60T 7/124* (2013.01); *B60T 13/665* (2013.01); *B60T 17/228* (2013.01); *B61H 13/00* (2013.01); *B60T 8/1705* (2013.01); *B60T 13/365* (2013.01); *B60T 15/021* (2013.01); *B60W 10/18* (2013.01)

(58) Field of Classification Search
CPC .... B60T 17/228; B60T 8/1705; B60T 13/365; B60T 15/021; B60T 13/665; B60W 10/18
USPC .................. 303/7, 128, 134, 135
See application file for complete search history.

(56) References Cited

U.S. PATENT DOCUMENTS

| | | | |
|---|---|---|---|
| 4,361,825 A | 11/1982 | Shockley | |
| 4,487,060 A | 12/1984 | Pomeroy | |
| 5,369,587 A | 11/1994 | Root et al. | |
| 5,722,736 A * | 3/1998 | Cook | B60T 17/228 303/15 |
| 5,924,774 A * | 7/1999 | Cook | B60T 13/665 303/115.2 |
| 7,722,134 B2 | 5/2010 | Kane | |
| 8,190,313 B2 * | 5/2012 | Moffitt | B60T 13/665 303/128 |
| 8,589,000 B2 * | 11/2013 | Moffitt | B60T 13/665 303/128 |
| 8,781,671 B2 | 7/2014 | Beck et al. | |
| 9,283,945 B1 * | 3/2016 | Kernwein | B60T 17/228 |
| 2002/0180264 A1 | 12/2002 | Moffitt | |
| 2016/0306360 A1 * | 10/2016 | Seaton | G05D 1/0276 |
| 2016/0306960 A1 * | 10/2016 | Gajulapalli | G06F 21/44 |

FOREIGN PATENT DOCUMENTS

| | | |
|---|---|---|
| WO | 2013174965 A2 | 11/2013 |
| WO | 2013181707 A1 | 12/2013 |

* cited by examiner

*Primary Examiner* — Thomas Irvin
(74) *Attorney, Agent, or Firm* — Miller, Matthias & Hull

(57) ABSTRACT

A braking system includes a brake pipe, a pressure sensor and a pressure valve, each operatively associated with the brake pipe. The pressure valve is directed to reduce a pressure in the brake pipe in response to data from the pressure sensor, and a secondary pressure sensor is operatively associated with the brake pipe, wherein a pressure in the brake pipe is reduced in to data from the secondary pressure sensor.

8 Claims, 2 Drawing Sheets

AUTOMATIC BRAKING SYSTEM

TECHNICAL FIELD

This disclosure generally relates to train braking systems, and more particularly, relates to an automatic train braking system.

BACKGROUND

Rail transportation is commonly used to move people and cargo. Trains of wheeled vehicles often provide a more efficient and timely means of travel than other forms of transportation. Material can be moved solely via rail, or can use rail transportation as a segment within an inter-modal system. Trains generally travel on one or more rails, but can also use other stabilization and directional devices, including electromagnetics.

Trains are powered by one or more locomotives or powered cars, and are usually controlled by an operator. The operator is generally present on board the train, although other arrangements are possible. Propulsion can be provided by a variety of on-board motors, including reciprocating engines, turbines, electric motors, diesel-electric systems or electromagnetic systems. The energy source can be carried on board the train in the form of fuel or battery power. Alternatively, the train can draw power from an external system, such as overhead power lines or an additional electrified rail near ground level.

The operator may control the train by manipulating manual controls or issuing vocal or electronic signals in a cab or a remote location. Trains may have a manual control mode where the train can directly respond to operator inputs regarding commands for applied throttle or other systems. Such a manual control mode may receive operator commands through a hand throttle, or other manual control. The operator may be located within the locomotive, or remotely relative to the locomotive.

Alternatively, the train may be operated by an automatic drive system (ADS). An operator may elect to engage the ADS over operating the train using manual commands. The ADS may determine train settings for applied throttle or other systems, and it may select these settings using pre-set algorithms that optimize train performance variables in light of various factors or functional preferences.

A train braking system, used to slow or stop the train, may also be controlled either manually or through an ADS. The braking system may use a pressurized brake pipe to control train braking. Alterations in the pressure within the brake pipe may allow a braking operation to occur. Such alterations may be triggered manually or by automatic systems.

Kane (U.S. Pat. No. 7,772,2134) discloses a "Failsafe Electronic Braking System for Trains." Kane describes a system for activating a pressure valve on a brake pipe in response to an overspeed signal, a loss of power to the train control system or a braking signal from the cab or an alerter. However, Kane does not describe a braking system that activates braking in response to a sensed brake pipe pressure. Further, Kane does not describe a redundant brake pipe sensor that may also activate a braking operation.

Accordingly, there is a need for an improved braking system to ensure operability.

SUMMARY OF THE DISCLOSURE

In one aspect, a locomotive braking system is disclosed. The locomotive braking system may include a plurality of interconnected cars, a brake pipe extending through each of the plurality of interconnected cars and communicating a pressurized fluid, a pressure valve operatively associated with the brake pipe, a pressure sensor operatively associated with the brake pipe, the pressure valve being directed to reduce a pressure in the brake pipe in response to data from the pressure sensor, and a secondary pressure sensor operatively associated with the brake pipe, a pressure in the brake pipe being reduced in response to data from the secondary pressure sensor.

In another aspect, a brake pipe is disclosed. The brake pipe may include a pressure valve operatively associated with the brake pipe, a pressure sensor operatively associated with the brake pipe, the pressure valve being directed to reduce a pressure in the brake pipe in response to data from the pressure sensor, and a secondary pressure sensor operatively associated with the brake pipe, a pressure in the brake pipe being reduced in response to data from the secondary pressure sensor.

In another aspect, a method for altering a pressure of a brake pipe is disclosed. The method may include sensing the pressure in a brake pipe using a pressure sensor, directing a pressure valve to reduce a pressure in the brake pipe in response to data from the pressure sensor, sensing the pressure in the brake pipe using a secondary pressure sensor, and directing a secondary pressure valve to reduce a pressure in the brake pipe in response to data from the secondary pressure sensor.

These, and other aspects and features of the present disclosure, will be better understood upon reading the following detailed description when taken in conjunction with the accompanying drawings.

DETAILED DESCRIPTION

Figure 1:
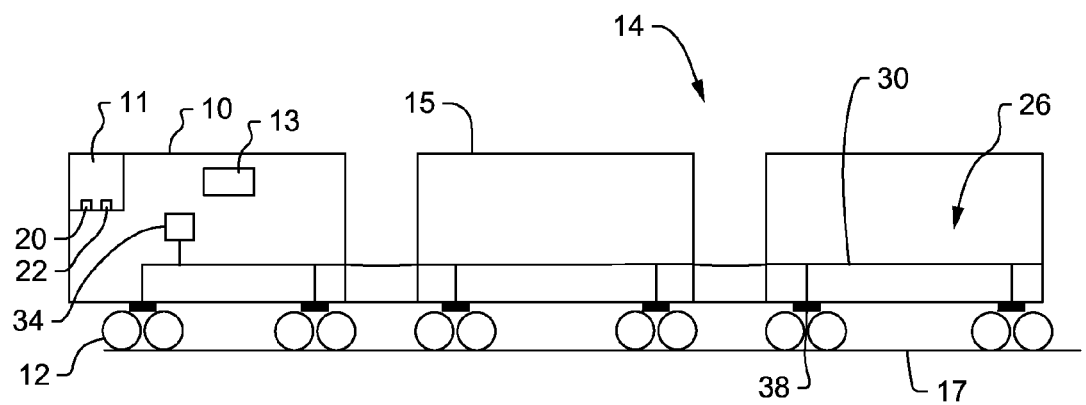
FIG. 1 is a schematic side view of a train including a number of cars constructed in accordance with the present disclosure.

Referring now to the drawings, and with specific reference to FIG. 1, a locomotive constructed in accordance with the present disclosure is generally referred to by reference numeral 10. The locomotive 10 may include a cab 11, a plurality of wheels 12 and an engine 13, and may pull a train 14 consisting of a variety of cars 15 along one or more rails 17. The engine 13 may consist of one or more reciprocating engines, turbines, electric motors or electromagnetic systems. A fuel or energy source can be carried on board the train 14 in the form of fuel or battery power, or can be positioned along the rails 17.

The locomotive 10, or a powered car 15, may power one or more of the wheels 12 in contact with the one or more rails 17, propelling the train 14 along the rail 17. An operator may be located within the cab 11, train 14 or remotely relative to the train 14 in a remote operator station. The operator may issue commands to influence the performance of the train 14.

The locomotive 10 may include a manual mode of operation. In this mode, the operator may manually command settings which directly affect various train 14 actions and systems. The locomotive control interface 18 may include a manual control 20 and an electronic control 22. Using the manual control 20 and electronic control 22, an operator in the cab 11 may control the locomotive 10 and the train 14 settings. For example, the manual control 20 position may command a braking operation. Further, the electronic control 22 may be activated by an operator, entity or algorithm located at a remote location.

For reducing train 14 speed, a braking system 26 may be provided on the train 14. The braking system 26 may include a brake pipe 30, which may pass through one or more cars 15. The brake pipe 30 may contain pressurized air, or another fluid, which may be pressurized by a compressor 34. Brakes 38 may be used to slow the rotation of one or more wheels 12, thus slowing the speed of the train 14. In one embodiment, the brakes 38 may be activated by a reduction in brake pipe 30 pressure.

Figure 2:
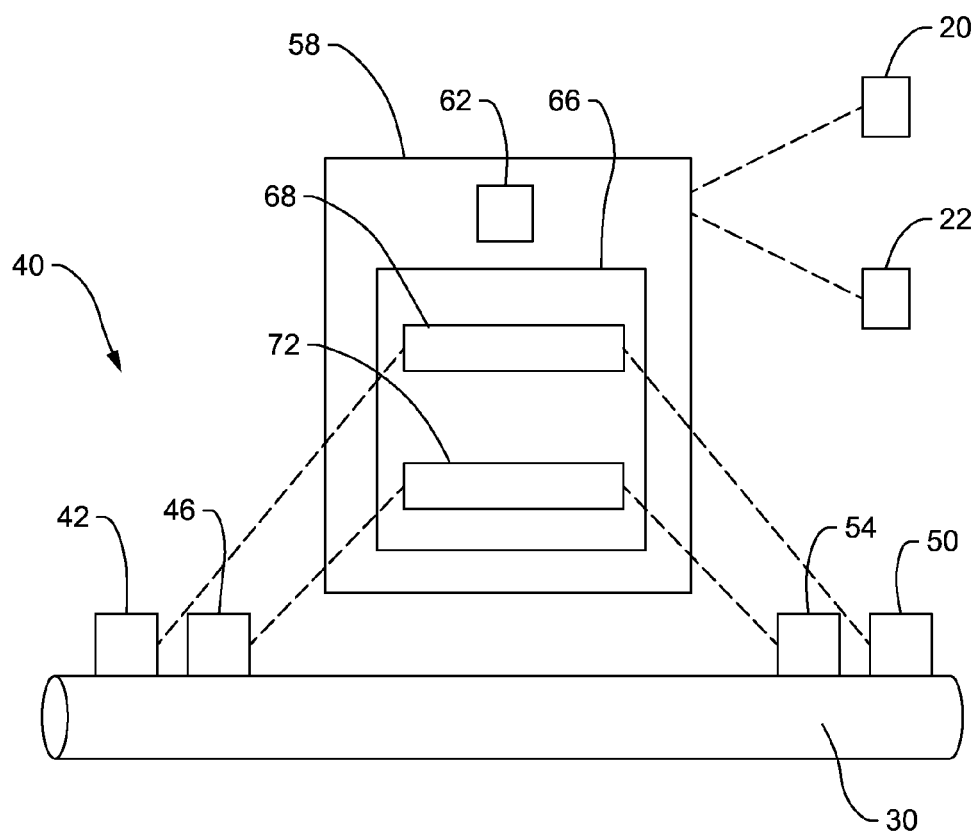
FIG. 2 is a schematic diagram of elements which may be included in an embodiment of the present disclosure.

A braking control system 40 constructed in accordance with the present disclosure is shown in FIG. 2. The braking control system 40 may sense, analyze and command braking operations in response to a variety of inputs. A braking operation, or braking process, may be a reduction in brake pipe 30 pressure. Pressure in the brake pipe 30 may be reduced through a pressure valve 42 or a secondary pressure valve 46. The pressure valve 42 and secondary pressure valve 46 may be solenoid valves. Further, pressure in the brake pipe 30 may be sensed by a pressure sensor 50 or a secondary pressure sensor 54. The pressure sensor 50 and secondary pressure sensors 54 may be transducers.

The braking control system 40 may also include a controller 58. The controller 58 may be in electrical communication with the pressure valve 42, secondary pressure valve 46, pressure sensor 50, secondary pressure sensor 54, electronic control 22 and manual control 20. In turn, the controller 58 may include a processor 62 and a memory 66. The memory 66 may further include a primary algorithm 68 and a secondary algorithm 72. Although shown in the memory 66, the secondary algorithm 72 may be located in a different location or device.

In operation, the train 14 may be traveling at a certain speed through various conditions. Braking ability may be a function of available brake pipe 30 pressure. Accordingly, to ensure adequate slowing and stopping ability, certain brake pipe 30 pressures may be treated as thresholds. Below such a threshold, the controller 58 may command a braking operation to ensure the train 14 is an appropriate speed. Further, the controller 58 may include more than one threshold. The thresholds may be determined based on a number of variables, including train 14 speed or composition, rail 17 condition, rail 17 layout, weather condition or other parameters, and they may further be determined based on the ability to perform different types of braking operations. Additionally, a first and a second threshold may be stored in the memory 66, and each may vary according to the above-listed parameters. In one embodiment, the first threshold may correspond to a penalty braking threshold and the second threshold may correspond to an emergency braking threshold, although other thresholds and parameters are possible. A penalty brake may be a braking operation that cannot be reversed until the train 14 is not moving. An emergency brake may be a braking operation demanding the maximum stopping power provided by the braking system 26.

The memory 66 may also include a primary algorithm 68 and a secondary algorithm 72. As the train 14 is operating, the first threshold regarding brake pipe 30 pressure may be continuously calculated by the controller 58. Simultaneously, the brake pipe 30 pressure may be sensed by the pressure sensor 50. Prior braking operations, or damage to the brake pipe or other components, may cause a drop in brake pipe 30 pressure. Accordingly, when the brake pipe 30 pressure drops below the first threshold, the pressure sensor 50 may signal the controller 58. Upon receiving this data, the primary algorithm 68 may command the pressure valve 42 to decrease the pressure in the brake pipe 30, thus slowing the train 14. Alternatively, the pressure sensor 50 may send the data to an operator or other entity, who can then command a braking operation.

Finally, upon an indication that the train 14 speed and brake pipe 30 pressure are now within acceptable bounds, the controller 58 may generate a confirmation signal that no further braking action is needed. Such an indication may come from the pressure sensor 50, a time period elapsing, the pressure valve 42, train 14 speed or another train 14 variable.

As the train 14 is operating, the second threshold regarding brake pipe 30 pressure may also be continuously calculated by the controller 58. Simultaneously, the brake pipe 30 pressure may be sensed by the secondary pressure sensor 54. Prior braking operations, or damage to the brake pipe or other components, may cause a drop in brake pipe 30 pressure. Accordingly, when the brake pipe 30 pressure drops below the second threshold, the secondary pressure sensor 54 may signal the controller 58. Upon receiving this data, the secondary algorithm 72 may command the pressure valve 42, and/or the secondary pressure valve 46 to decrease the pressure in the brake pipe 30, thus slowing the train 14. Alternatively, the secondary pressure sensor 54 may send the data to an operator or other entity, who can then command a braking operation.

In another embodiment, when the brake pipe 30 pressure drops below the second threshold, and no confirmation signal is generated by the controller 58, the secondary pressure sensor 54 may signal the controller 58. Upon receiving this data, the secondary algorithm 72 may command the pressure valve 42, and/or the secondary pressure valve 46 to decrease the pressure in the brake pipe 30, thus slowing the train 14. Alternatively, the secondary pressure sensor 54 may send the data to an operator or other entity, who can then command a braking operation.

In a further embodiment, when the brake pipe 30 pressure drops below the second threshold, and a time period has passed since the pressure sensor 50 signaled the controller 58 that the brake pipe 30 pressure fell below the first threshold, the secondary pressure sensor 54 may signal the controller 58. Upon receiving this data, the secondary algorithm 72 may command the pressure valve 42, and/or the secondary pressure valve 46 to decrease the pressure in the brake pipe 30, thus slowing the train 14. Alternatively, the secondary pressure sensor 54 may send the data to an operator or other entity, who can then command a braking operation.

The system provides redundancy and automation to critical areas of train 14 operation, advantageously improving train efficiency and safety. By ensuring the train 14 slows upon a brake pipe 30 pressure drop past certain thresholds, operators are assured that a damaged brake pipe 30, other damaged equipment or repetitive cyclic braking will not cause adverse situations.

Figure 3:
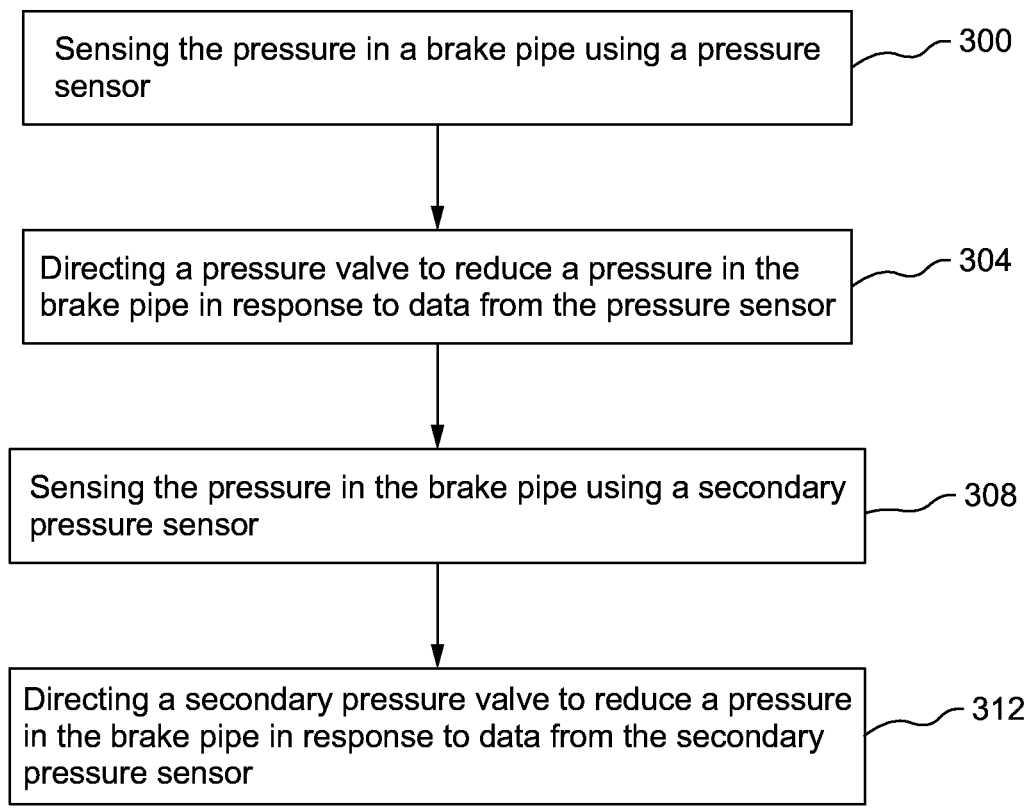
FIG. 3 is a flowchart depicting a sample sequence of actions which may be practiced in an embodiment of the present disclosure.

A method for altering a pressure of a brake pipe can best be understood by referencing the flowchart in FIG. 3. The method may comprise sensing the pressure in a brake pipe using a pressure sensor, as shown in step 300. The method may also include directing a pressure valve to reduce a pressure in the brake pipe in response to data from the pressure sensor, as shown in step 304, and sensing the pressure in the brake pipe using a secondary pressure sensor, as shown in step 308. Further, the method may include directing a secondary pressure valve to reduce a pressure in the brake pipe in response to data from the secondary pressure sensor, as shown in step 312.

INDUSTRIAL APPLICABILITY

In operation, the present disclosure sets forth a braking system which can find industrial applicability in a variety of settings. For example, the disclosure may be advantageously employed in the automatic control of locomotives, or other vehicles. More specifically, a pressure sensor may sense a brake pipe pressure, and determine when said pressure falls below a first threshold. The determination may be sent to a controller, which may issue a braking command. Upon receiving an indication that the train speed and brake pipe pressure are now within acceptable bounds, the controller may generate a confirmation signal that no further braking action is needed.

As a train is operating, a second threshold regarding brake pipe pressure may also be continuously calculated by the controller. Simultaneously, the brake pipe pressure may be sensed by the secondary pressure sensor. Prior braking operations, or damage to the brake pipe or other components, may cause a drop in brake pipe pressure. Accordingly, when the brake pipe pressure drops below the second threshold, the secondary pressure sensor may signal the controller. Upon receiving this data, the secondary algorithm may command the pressure valve, and/or the secondary pressure valve to decrease the pressure in the brake pipe, thus slowing the train. Alternatively, the secondary pressure sensor may send the data to an operator or other entity, who can then command a braking operation.

The system provides redundancy and automation to critical areas of train operation, advantageously improving train efficiency and safety. By ensuring the train slows upon a pressure drop beyond certain thresholds, operators are assured that a damaged brake pipe, other damaged equipment or repetitive cyclic braking will not cause adverse situations.

The disclosed system braking system may be original equipment on new machines or locomotives, or added as a retrofit to existing machines or locomotives.

What is claimed is:

1. A locomotive braking system, comprising:
   a plurality of interconnected cars;
   a brake pipe extending through each of the plurality of interconnected cars and communicating a pressurized fluid;
   a pressure valve operatively associated with the brake pipe;
   a pressure sensor operatively associated with the brake pipe, the pressure valve being directed to reduce a pressure in the brake pipe in response to data from the pressure sensor;
   a secondary pressure sensor operatively associated with the brake pipe, a pressure in the brake pipe being reduced in response to data from the secondary pressure sensor; and
   a controller in communication with the pressure sensor, pressure valve and secondary pressure sensor, wherein:
   the controller includes a memory and a processor, the memory includes a primary algorithm and a secondary algorithm, such that the primary algorithm directs the pressure valve to begin a braking process upon receiving a signal from the pressure sensor indicating the pressure in the brake pipe is below a first threshold, and the secondary algorithm reduces a pressure in the brake pipe in response to data from the secondary pressure sensor indicating the pressure in the brake pipe is below a second threshold in the absence of a confirmation signal generated by the controller.

2. The locomotive braking system of claim 1, wherein the brake pipe pressure reduction is a penalty braking operation.

3. The locomotive braking system of claim 1, wherein the brake pipe pressure reduction is an emergency braking operation.

4. The locomotive braking system of claim 1, wherein the brake pipe is pressurized with a compressor.

5. The locomotive braking system of claim 1, wherein the braking system includes a secondary pressure valve, and wherein the secondary pressure valve is directed to reduce a pressure in the brake pipe in response to data from the secondary pressure sensor.

6. A locomotive braking system, comprising:
   a plurality of interconnected cars;
   a brake pipe extending through each of the plurality of interconnected cars and communicating a pressurized fluid;
   a pressure valve operatively associated with the brake pipe;
   a pressure sensor operatively associated with the brake pipe, the pressure valve being directed to reduce a pressure in the brake pipe in response to data from the pressure sensor;
   a secondary pressure sensor operatively associated with the brake pipe, a pressure in the brake pipe being reduced in response to data from the secondary pressure sensor; and
   a controller in communication with the pressure sensor, pressure valve and secondary pressure sensor, wherein:
   the controller includes a memory and a processor, wherein the memory includes a primary algorithm and a secondary algorithm, wherein the primary algorithm directs the pressure valve to begin a braking process upon receiving a signal from the pressure sensor indicating the pressure in the brake pipe is below a first threshold, wherein the secondary algorithm reduces a pressure in the brake pipe in response to data from the secondary pressure sensor indicating the pressure in the brake pipe is below a second threshold after a time period has elapsed from the pressure sensor sensing the pressure in the brake pipe is below the first threshold.

7. The locomotive braking system of claim 6, wherein the brake pipe pressure reduction is an emergency braking application.

8. A brake pipe, comprising:
   a primary pressure valve operatively associated with the brake pipe;
   a primary pressure sensor operatively associated with the brake pipe, the primary pressure valve being directed to reduce a pressure in the brake pipe in response to data from the primary pressure sensor;
   a secondary pressure sensor operatively associated with the brake pipe, a pressure in the brake pipe being reduced in response to data from the secondary pressure sensor; and
   a controller in communication with the primary pressure sensor, primary pressure valve, secondary pressure sensor and secondary pressure valve, the controller including a memory and a processor, the memory including a primary algorithm and a secondary algorithm, wherein the primary algorithm directs the primary pressure valve to begin a braking process upon receiving a signal from the primary pressure sensor indicating the pressure in the brake pipe is below a first threshold, and wherein the secondary algorithm reduces a pressure in the brake pipe in response to data from the secondary pressure sensor indicating the pressure in the brake pipe is below a second threshold in the occurrence of at least one of: (i) an absence of a confirmation signal generated by the controller, and (ii) a predetermined time period has elapsed from when the pressure sensor senses the pressure in the brake pipe is below the first threshold.

* * * * *